Nov. 24, 1953

E. R. WILFLEY 2,660,487

CENTRIFUGAL PUMP BEARING SEAL

Filed May 31, 1951

INVENTOR
Elmer R. Wilfley
BY
Arthur Middleton
ATTORNEY

Nov. 24, 1953 — E. R. WILFLEY — 2,660,487
CENTRIFUGAL PUMP BEARING SEAL
Filed May 31, 1951 — 5 Sheets-Sheet 5

INVENTOR
Elmer R. Wilfley
BY
Arthur Middleton
ATTORNEY

Patented Nov. 24, 1953

2,660,487

UNITED STATES PATENT OFFICE 2,660,487

CENTRIFUGAL PUMP BEARING SEAL

Elmer R. Wilfley, Denver, Colo., assignor to A. R. Wilfley and Sons, Inc., Denver, Colo., a corporation of Colorado Application May 31, 1951, Serial No. 229,092

4 Claims. (Cl. 308—36.4)

This invention relates to centrifugal pumps of the type adapted to pump slurries or liquids with solids in suspension.

More particularly, this relates to a type of pump which may be called the frictionless type because it has no packing gland or stuffing box around the pump impeller shaft but instead is provided with an annular check valve assembly surrounding the shaft and adapted at the proper times to open and to close an annular or valvular gap between the shaft and the pump housing, so as to maintain the gap open while the pump is running and keeping it closed and the gap sealed when the pump is at a standstill. An auxiliary impeller carried by the shaft within the casing furnishes sufficient counteracting hydraulic pressure for containing the liquid or slurry being pumped so as to prevent its leakage from the housing through the valvular gap while the same is open.

Such a pump is exemplified in the United States Patent No. 1,976,532 to Wilfley, which shows an impeller shaft encircled by an annular spring-loaded check valve co-operatively associated with a speed-controlled actuating mechanism that shifts the valve axially upon the shaft for opening or closing the annular valvular gap around the shaft between it and the pump casing. In that patent, the shifting is effected automatically by the valve-actuating mechanism which is speed-controlled in that it comprises centrifugally actuated weighted levers, whereby, when the pump is not operating, the check valve is normally held or urged into closing and sealing position by the pressure of a spring. When the impeller shaft starts rotating, centrifugally operated weighted levers function overcomingly against the pressure of the spring to shift the check valve from its sealing position to its open position, keeping the valve open as long as the pump is running and the running of the pump sustains the centrifugal force necessary to hold the weighted levers in valve-opening position against the pressure of the spring. Meanwhile, leakage through the annular valvular gap is counteracted by an auxiliary impeller which may be termed a sealing impeller disposed between the pump impeller and the valvular gap, and bladed impeller coaxial with the impeller shaft and rotating therewith.

Rotation of the auxiliary impeller creates hydraulic pressure opposing the tendency of leakage of liquid through the gap. When the pump stops running, the check valve shifts from open to sealing position due to the restored effectiveness of the spring pressure as the hydraulic sealing pressure from the auxiliary impeller dies down along with the waning of the centrifugal force that otherwise shifts and holds the check valve against the spring pressure.

Further particularized, this invention then relates to improvements in the check valve assembly, that is in the construction of the check valve itself as well as in the automatic actuating mechanism therefor.

The structural environment of these improvements is exemplified in the pump of the aforementioned patent, namely a pump having its impeller shaft journalled in two spaced-apart bearings both at one side of the pump housing. The check valve assembly to which the present improvements relate is located between the pump housing and the bearing nearest to the housing.

Associated with the check valve assembly are protective means for shielding the adjacent shaft bearing against contact with the slurry being pumped inasmuch as with the shifting movements of the check valve member some momentary leakage of slurry may occur through the valve opening, or it may come from other sources. Such bearing-protective means are labyrinthic in that they comprise a stationary labyrinth member unitary with the stationary parts of the bearing, and a rotary labyrinth member in labyrinth-forming relationship with the stationary member and integral with and characterized by a relatively long sleeve fitting the shaft and fixed thereto and extending towards the pump housing and in fact extending even into the valvular gap, this sleeve serving as a basis for mounting and carrying upon it and rotating therewith the valve member together with the actuating mechanism therefor, this sleeve herein conveniently to be termed the basic sleeve.

The patented Wilfley construction for its part is further characterized in that it provides as a unitary part of the check valve assembly and rotating therewith a coaxial protective shell which surrounds and shields the valve actuating mechanism proper and even extends outwardly open to surround the labyrinthically coacting parts of the bearing-protective means. The inner end of this shell is closed by a deformable diaphragm sealing it with respect to the basic sleeve. Thus it is another characteristic of this patented pump that its valve member is rigidly connected to the inner closed end of this shell to be shiftable therewith, so that the shell represents a septum between the valve member and the actuating mechanism, necessitating an elongated assembly in which the actuating mechanism is significantly spaced outwardly from the valve member proper with the thus confined weighted levers and other parts of the actuating mechanism closely hugging the basic sleeve. Because of this characteristic inclusion of the surrounding shell in the mechanism the patented Wilfley pump may be referred to as a "closed" type pump or in a more specific sense its valve actuating mechanism may be referred to as the "closed" type mechanism.

Again, the patented construction has the annular check valve member in the form of a cylindrical slidable member disposed between the shell and the pump housing and indeed rigidly unitary with the shiftable shell, and thus to be slidable and shiftable upon the aforementioned basic sleeve which is rigidly unitary with the shaft. Characteristically, this valve member has a conically wedge-shaped forward seating part engaging upon and wedging into a correspondingly shaped seat in and around the valvular gap. Because this slidable valve member outside the shell must be shifted axially along the shaft by the shell-protected actuating mechanism or the centrifugal weights within the shell, this "closed" type construction has drawbacks among which are: an axially rather elongated check valve assembly due to the interposition of the shell between the valve member and the actuating mechanism accompanied by certain structural complications because of such interposition; a factor of unreliability in the control and operation of the valve member because of potential friction and binding between the valve member and the shaft as the valve member shifts upon the shaft together with the shell while exposed to the liquid being pumped; furthermore the inaccessibility of the centrifugal weights confined within the shell accompanied by a certain undependability in their operation when dust, liquid, or even some slurry would somehow enter and get trapped in the shell and hamper the operation of the centrifugal weights without offering the possibility of directly or readily ascertaining the extent of such a condition, thus requiring relatively heavy and bulky triangular or three-weight arrangement to assure as far as possible that these weights would execute their control action upon the valve member in view of the danger of their becoming impounded; and yet another difficulty, namely that of dismounting or replacing the centrifugal weights having the shaft-encircling shell surrounding them.

Another limitation of the patented construction lay in the fact that the pump was difficult to dismantle because of the difficulty in removing the long-sleeved rotary labyrinth member from the pump shaft.

Still another limitation lay in the fact that the protective shell confining the weighted levers necessitated their being placed not only spaced outwardly relatively far from the valve member proper, but also in closely hugging relationship with respect to the shaft or basic sleeve, thus imposing limiting conditions upon the disposition and the centrifugal or kinematic efficiency of the weights which limitation in turn must be compensated for as far as possible by greater bulk of the centrifugal levers or weights.

Therefore, it is among the objects of this invention to provide a more compact as well as simplified assembly of valve member and actuating mechanism upon the pump shaft, briefly a more compact and structurally simpler valve assembly, in which the aforementioned drawbacks or limitations are absent. Hence it is among the objects that this assembly be compact; that it be structurally very simply as well as easy to assemble, disassemble and adjust; that the valve member be frictionless in its operation relative to the shaft and that it be unsusceptible with respect to ill effects from the slurry being pumped; that the valve member be capable of proper and leak free closing of the valvular gap, free from wedging action upon the valve seat as well as self-adjustingly seatable; that the centrifugal weights operate more reliably in controlling the valve member; that the speed-controlled actuating mechanism be accessible as for observation and inspection and that it should tend to have a self-cleansing action; that the speed-controlled actuating mechanism be more readily dismountable and replaceable; and that the control effectiveness and control reliability of the weighted levers be enhanced even though their actual weight be significantly reduced or minimized; and that the assembly and the valve member in particular have significantly greater durability.

These objects are attained by providing a pump, and more specifically a valve member with valve-actuating mechanism therefor of the type that is disposed between the pump housing and the nearest shaft bearing, in which the interposed shell is omitted so that the actuating mechanism is accessible and observable while its self-cleansing action is encouraged, and at the same time provision is made for a re-organization and improved structural relationship of parts whereby a closer and more direct coaction is attainable between the valve member and the weighted levers as well as greater kinematic efficiency of the weights even at a reduction in weight or bulk.

With the shell eliminated to make this what may herein be termed an "open" type mechanism, the improved relationship of parts and their improved operation are attained along with a compacting and simplification of the assembly and foreshortening of the basic sleeve and along with greater operating reliability, centrifugal efficiency, and greater durability, by providing the fulcrum points for the weighted levers to be disposed in the peripheral proximity of the valve member itself rather than having them spaced outwardly therefrom and hugging the impeller shaft. Thus the non-weighted ends of the levers engage the valve member directly at the very periphery thereof, at which periphery moreover the weighted ends have relatively greater centrifugal effect even though they now may be lighter in absolute weight. For thus placing and mounting the levers a spider seated upon the basic sleeve is provided with spider arms reaching towards the periphery of the valve member to present peripherally disposed fulcrum points whereby the levers can act peripherally directly upon the valve member in the manner conceived by this invention, further with a shaft encircling compression coil spring disposed between the spider and the valve member for urging the valve member into sealing position. Importantly, by this invention the valve member instead of being bodily slidable with respect to the shaft is rendered deflectably connected therewith, so that friction due to any sliding faces is eliminated by way of providing for a floating movement of the valve member when being shifted. That is to say, according to this invention the valve member comprises a rim portion which is resiliently and floatingly supported upon the shaft by way of a deflectable diaphragm portion connecting it sealingly thereto, with the spring urging the rim portion into sealing engagement with the housing portion that surrounds the valvular gap, and with the weighted levers or speed controlled means operable overcomingly against the spring means to axially shift the rim portion in a floating non-guided and non-sliding kind of movement to non-sealing position, as the case may be.

Furthermore, the rotary labyrinth member together with its shaft-fitting basic sleeve is longitudinally split although bolted together in an unobstructive manner, and the split halves are significantly surrounded by and confined in a collar such as the hub portion of the aforementioned spider, so the mechanism can be readily assembled and dissembled upon the impeller shaft.

Some features lie in the construction of the deflectably operable valve member, as well as in certain novel structural and functional relation of that valve member to the weighted levers; other features lie in the longitudinally split construction of the rotary labyrinth member and basic sleeve, in the manner of interconnection of the split halves of the sleeve, as well as in the relationship of the basic sleeve with respect to the spider and other parts associated therewith.

According to one feature the valve member comprises a rim portion of semi-stiff or rubberized material integral with a deflectable diaphragm portion and a hub or collar portion of similar material in turn integral with the diaphragm portion and tightly hugging the shaft-fitting basic sleeve. Thus the rim portion is axially shiftable in a floating manner to effect opening and closing the valvular gap by way of deflection or resilient deformation of the diaphragm portion which floatingly supports the rim upon the shaft. More in particular, the rim portion effectively and reliably closes upon a circular ridge formed upon the housing concentrically with the valvular gap, without wedging action or friction between moving parts.

According to a related feature, the rim portion of the valve member is backed by and seated in an annular plate member which floats together with the rim portion, having an inside diameter amply clear of the basic sleeve so that there is no friction whatever. The rim portion is axially shiftable by the non-weighted ends of the levers directly engaging peripheral points of the plate member to impart thereto axial floating movement when opening or closing the valvular gap.

More specifically, concentric seating of the rim portion with respect to and upon the plate member as well as its retention in the plate member are effected by providing the rim portion with an outwardly widening conically shaped peripheral portion adapted to fit into a correspondingly shaped conically dovetailed circular recess on the annular plate member. That is to say, the rim portion by resilient deformation thereof is capable of being resiliently collapsed and inserted or forced and sprung into the recess and to be snugly held thereby so as to be rendered self-contained and unitary with the rim portion. Further particularized, this feature provides notch-like interruptions in the extreme outer edge portion of the rim portion to interengage with rotation preventing lugs provided interiorly of the circular recess. The plate member serves as abutment for and is engaged and urged into gap-sealing position by one end of the shaft-encircling compression spring, the other end of the spring being braced against the hub of the spider or against a shoulder of the basic sleeve.

Further particularized, the feature provides an annular cap of resiliently stretchable material or rubber that fits snugly around the impeller shaft itself as well as snugly over the inner end portion of the basic sleeve within the valvular gap.

According to another feature, the non-weighted ends of the levers engage directly upon marginal lugs or transverse faces provided on the annular plate for imparting thereto axial floating movement when opening or closing the valvular gap, while the rim portion with the plate is compactly lodged or cradled in the space between the spider arms, and the fulcrums of the levers are characteristically disposed radially outward from the periphery of the rim portion.

According to another feature the basic sleeve member together with its rotary labyrinth portion is longitudinally split so that the mechanism is rendered easy to assemble and to disassemle upon the impeller shaft. In conjunction with the split sleeve member this feature provides that the actuating mechanism contain only one pair of weighted levers instead of the usual three, arranged diametrically opposite to each other. These levers are fulcrumed upon a pair of arms which extend from the spider hub that encircles the sleeve portion in a snug fit thus holding the two halves thereof confined within and bound together by the hub. This hub in fact is seated against a shoulder of the sleeve portion and fixed thereto in such a manner that the levers are staggered substantially at right angles with respect to the plane of split of the sleeve member. Thus the spider arms are also staggered with respect to pairs of lugs whereby the halves of the sleeve member are screwed together. The lugs are rounded off at their leading edges to minimize resistance to and wear and tear by solids such as contained in slurry which may contact the parts and the bolt heads are disposed on the trailing end of the lugs whereby the bolt heads are shielded against abrasion. In addition these lugs also serve for screw-bolting the spider hub to the sleeve member, so that in this way the spider arms are also conveniently staggered at right angles with respect to the fastening screws.

More specifically, the heads for the fastening screws for the spider hub are protected against abrasion from slurry or other matter in the path of their rotation by a wall portion upstanding from the lug and curving around the bolt head and shielding at the leading side thereof.

In summary, this invention provides an improved check valve assembly, that is to say an improved check valve member with improved speed-controlled actuating mechanism therefor, the assembly as a whole being mounted upon, carried by, and rotating with the basic sleeve that surrounds and fits the impeller shaft, the sleeve being split into two halves lengthwise, but surrounded and bound together by the two-armed spider carrying a pair of opposedly arranged weight levers staggered at right angles relative to the split of the sleeve. The spider arms extend towards the pump housing as well as towards and even somewhat past the periphery of the check valve member which is axially movable to open and close the valvular gap and does so by a floating, non-guided, non-sliding kind of movement. That is, a floating rim portion of resiliently deformable material is seated and held in dovetail fashion in an annular backing plate also floating, and is sealingly connected to the sleeve and deflectably supported thereon by a diaphragm which is integral with the rim portion as well as with a collar or hub tightly surrounding the basic sleeve. The spider arms are so disposed with respect to this valve member that their fulcrums are located at the periphery of the valve member and so that the non-weighted ends of the levers engage directly upon the annular plate. The rim portion together with the diaphragm seals the valvular gap by non-wedgingly engaging the annular housing portion around the gap. A valve closing compression coil spring is confined between the annular backing plate and the spider.

As this invention may be embodied in other forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of equivalents of such metes and bounds, are therefore intended to be embraced by these claims.

Figure 1:
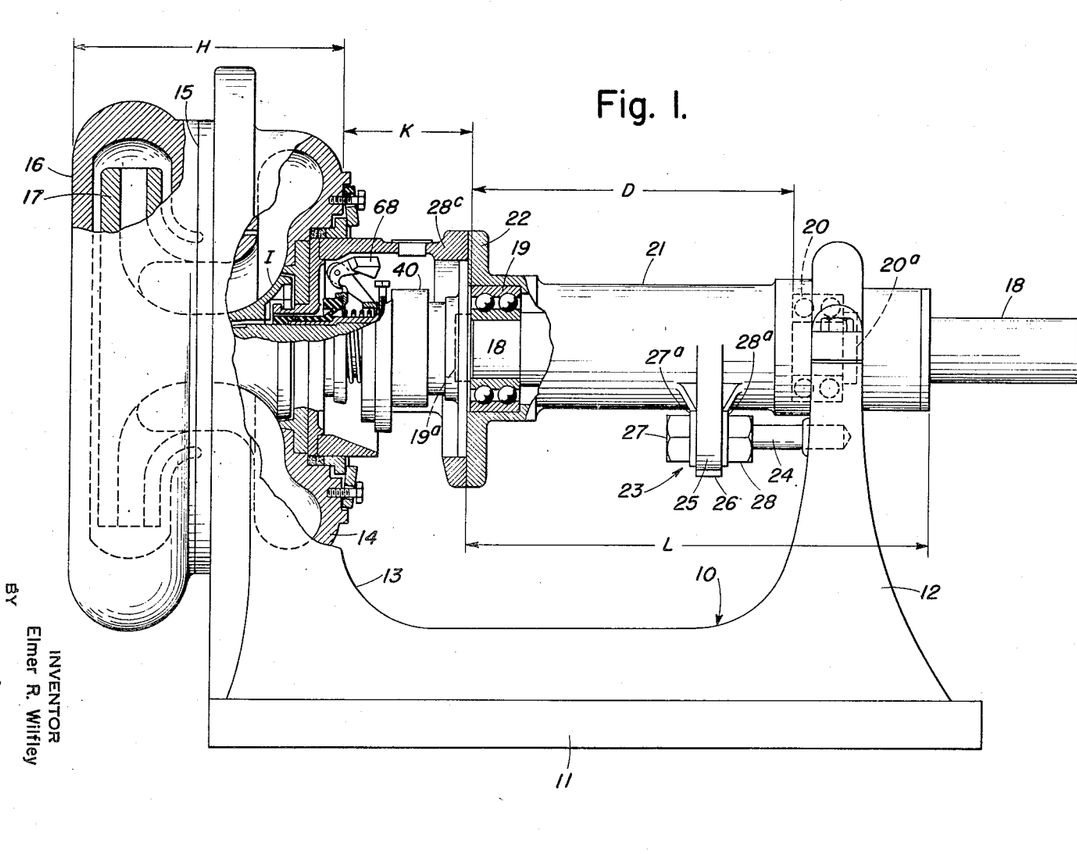
Figure 1 is a side view of the pump part-sectioned to show the improved check valve assembly.

The type of pump herein contemplated and part sectionally shown in Figure 1 comprises certain basic component sections outlined as follows: A base member 10 consisting of a horizontal base portion 11, an outer or rear upright portion 12, and an inner or front upright portion 13 which in turn forms and is integral with a shell portion 14 representing the inner or low pressure suction and intake portion of the pump housing which is indicated as a whole by the character H.

The inlet housing portion 14 is outwardly formed with a vertical flange 15, the face or plane of which extends transversely of the longitudinal extent of the base member 10. A complementary housing portion 16 representing the pressure and discharge end of the pump housing H, is detachably fastened as by bolts (not shown) to the vertical flange of intake housing portion 14. The inner suction end together with the outer discharge end of the housing represent an inner and an outer half shell respectively as component parts of the housing, having a suction inlet connection and a pressure discharge connection respectively here not shown. The outer half shell 16 of the housing surrounds the customary pump impeller 17 shown to be integral with a known auxiliary impeller I fixed upon an impeller shaft 18. The auxiliary impeller I is here shown to be bell-shaped with impeller blades B provided interiorly at the open end of the bell shape. The impeller shaft is rotatable in a pair of ball bearings namely an inner bearing 19 near the pump housing and an outer bearing 20 outwardly spaced a distance D from the inner bearing. The shaft is secured longitudinally with respect to the roller bearings by means of securing nuts $19^a$ and $20^a$ respectively. The two roller bearings 19 and 20 in turn are mounted in a cylindrical horizontally extending stationary bearing member 21 terminating inwardly in a vertical flange 22, the length of this bearing member being indicated at L. This bearing member 21 is secured against horizontal axial as well as against rotational displacement by a securing device 23 well known with this type of pump and comprising a horizontal stud 24 screwed into the outer upright portion 12 and extending inwardly therefrom as well as parallel to the horizontal axis of the pump shaft 18. The bearing member 21 has a pair of laterally extending lug portions 25 and 26 between which extends the stud 24. A pair of nuts 27 and 28 with washers $27^a$ and $28^a$ upon the stud are tightened against each other as well as against the lug portions 25 and 26 in a manner to secure the bearing member 21 in a longitudinally adjusted position as well as against rotation.

Figure 2:
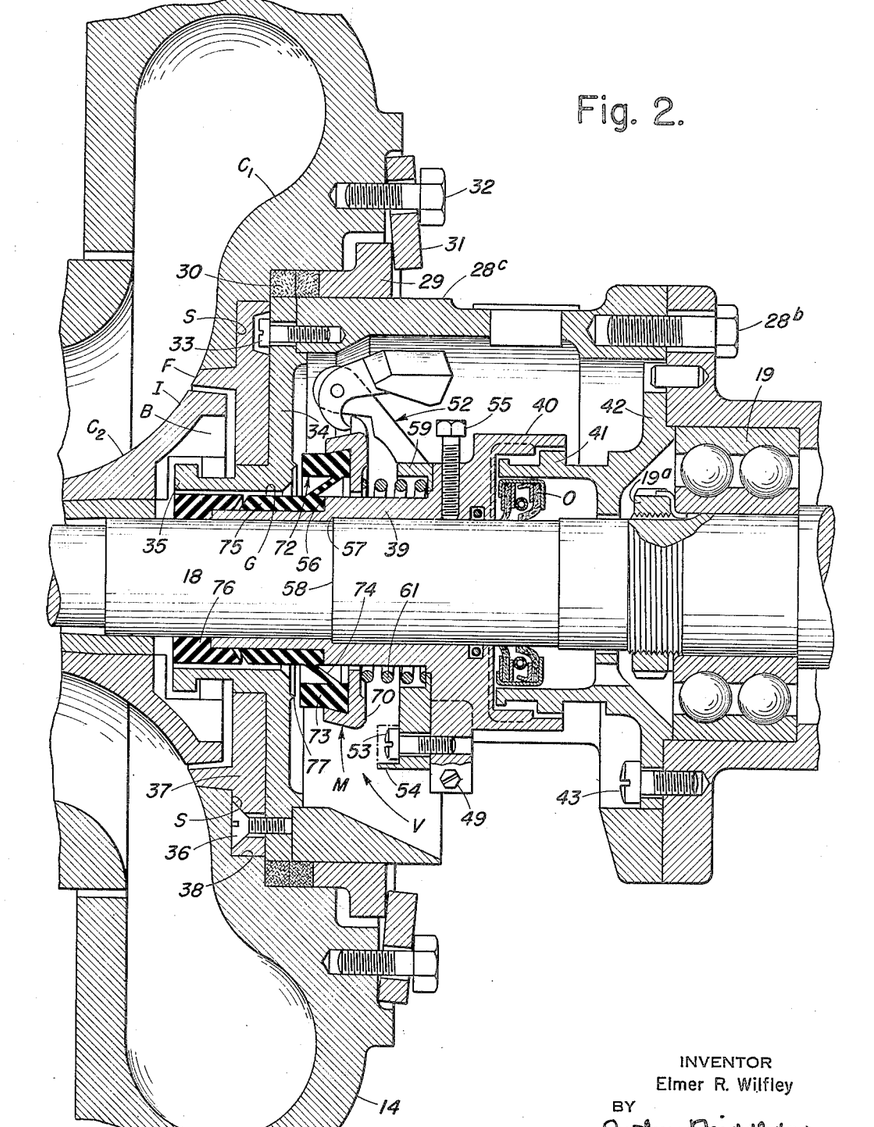
Figure 2 is an enlarged view of the part-sectioned check valve assembly of Figure 1 including certain structural environment of the assembly.

The bearing member 21 has fastened to its inner flanged end as by screw bolts $28^b$ a downwardly open cage member $28^c$ surrounding a check valve assembly V to be described below. The inner end of the cage member $28^c$ extends into and is supported by and in sealing relationship with the inner housing portion 14, being sealed against the housing by means of a gland member 29 acting upon an annular packing 30 and held in place by means of clamping members indicated at 31 and fastened to the housing as by screw bolts 32. The inner end of the cage member $28^c$ has detachably fastened thereto (see the details of Figures 2 and 3) as by means of screws 33 an annular end plate 34 formed with a cylindrical central portion 35 extending towards the housing and wide enough to accommodate therein the impeller shaft 18 to run freely, that is with a significant annular clearance or a valvular gap G provided around the shaft between it and the surrounding cylindrical portion 35 of plate 34. Fastened to the end plate 34 as by screws 36 is an annular member 37 fitted into and supported by an annular recess 38 constituting a shoulder S engaged by the annular member 37 which member is herein also termed a contour plate because it has extending from its free side into the pump housing an annular extension presenting at the end thereof a contoured face F complementing and merging with the inner contour $C_1$ of the intake portion of the housing as well as with the outer contour $C_2$ of the auxiliary impeller I.

The check valve assembly V within the cage member $28^c$ comprises what is herein termed the basic sleeve 39 which hugs the impeller shaft and rotates therewith, and which is formed at its outer end with a cup-shaped labyrinth portion 40 surrounding a stationary cylindrical labyrinth portion 41 having an outer flanged portion 42 fastened face-to-face to the flanged end of the bearing member 21 as indicated by fastening screws 43. Annular oil seals or sealing rings O for the adjoining ball bearing 19 are provided within the stationary labyrinth portion 41. The coacting labyrinth portions 40 and 41 constitute a protective device for the inner ball bearing 19.

Figure 4:
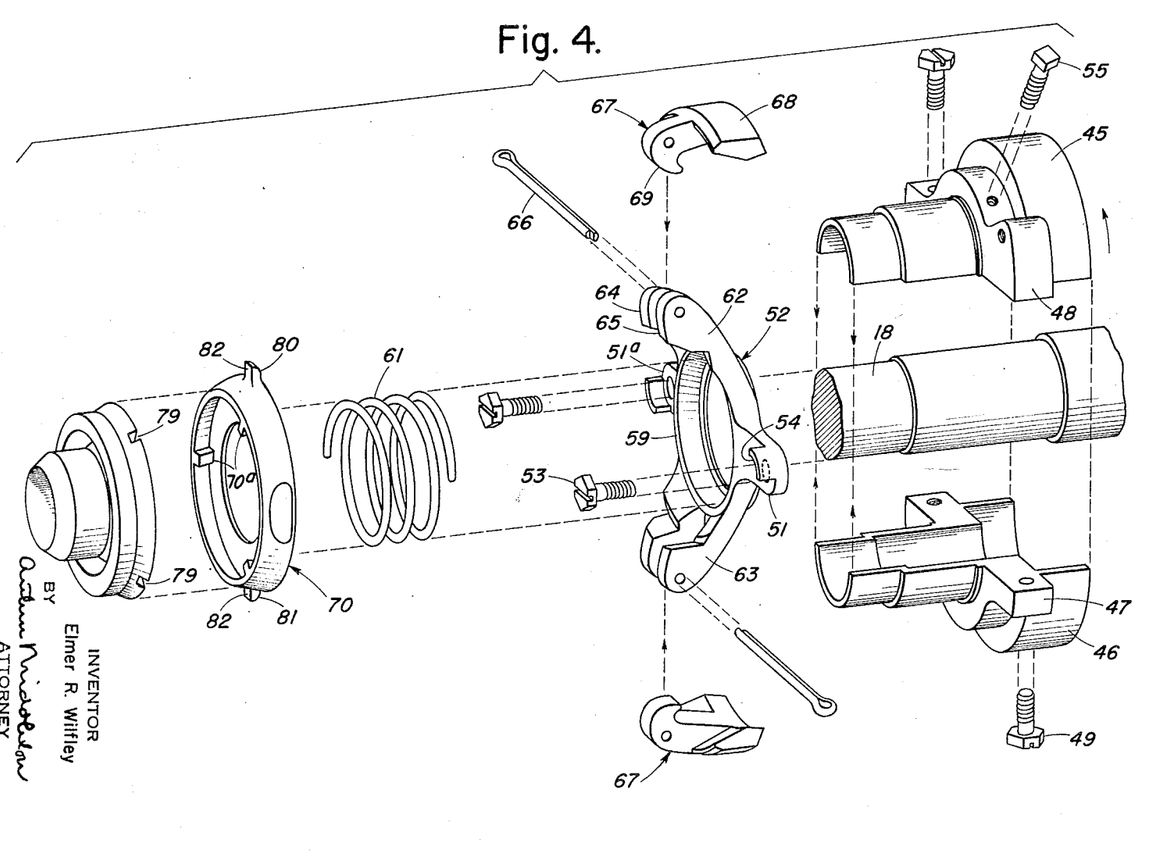
Figure 4 is an exploded perspective view of the parts of the check valve assembly.
Figures 5, 6, 7, 8:
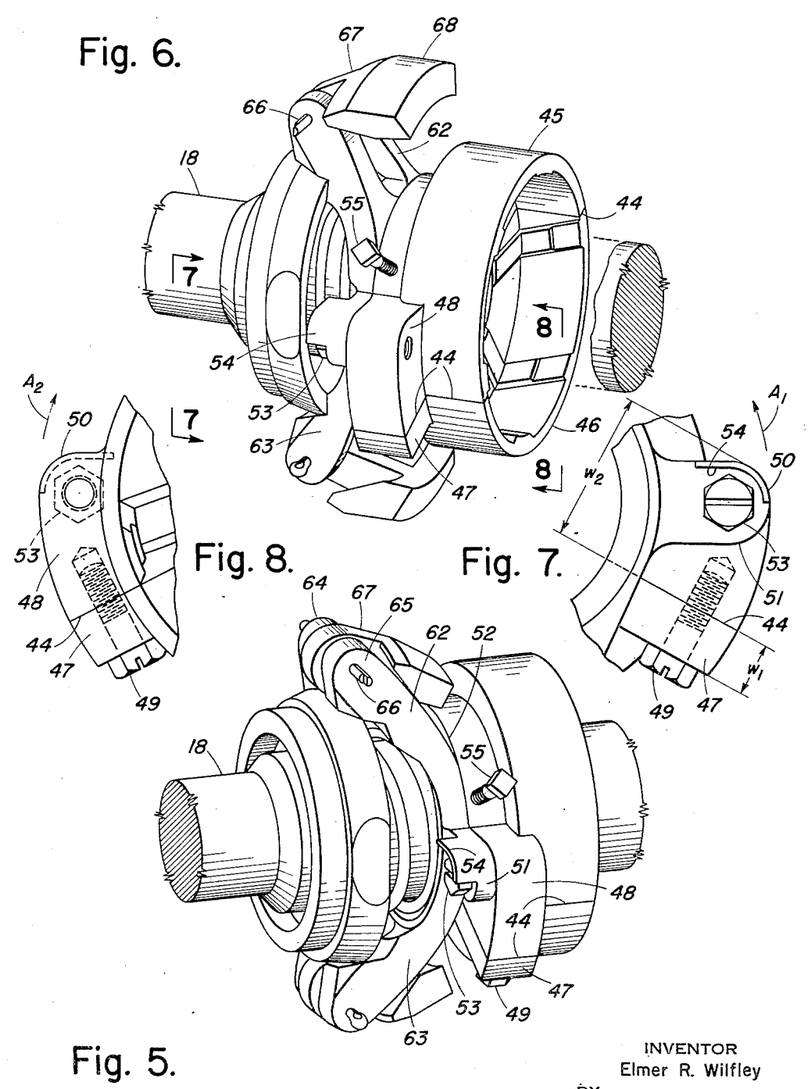
Figure 5 is a perspective view of the check valve assembly looked upon from the inner end thereof, showing also the split construction of the basic sleeve and the configuration and arrangement of the lugs for connecting the halves.
Figure 6 is a perspective view of the check valve assembly looked upon from the outer end thereof, showing the connecting lugs of Figure 5 together with a clearer view of the shielding wall or shield for the screw head that fastens the spider hub to one of the lugs.
Figure 7 is a partial detail view of the lug-and-bolt connection of the half portions of the sleeve, taken on line 7—7 of Figure 6.
Figure 8 is a partial detail view of the lug-and-bolt connection of the half portions of the sleeve, taken on line 8—8 of Figure 6.

The basic sleeve 39 is longitudinally split along a line indicated at 44 in Figures 5, 6, 7, 8 to constitute half portions 45 and 46 shown more clearly in the exploded view of Figure 4. The half portions 45 and 46 of the sleeve are bolted together in a manner shown more clearly in Figures 5 to 8, in that each side has a pair of lugs 47 and 48 held together by a transverse screw 49 the head of which is disposed at the trailing side of the connection, the direction of rotation of the shaft and of the sleeve being indicated by arrow $A_1$ in Figure 7 and by arrow $A_2$ in Figure 8. The lug 47 is of smaller width $W_1$ than the width $W_2$ of the companion lug 48, the latter lug moreover being shaped to present a leading corner portion 50 which is significantly rounded and shaped to match the outer contour of an eye portion 51 which extends laterally from the hub of a spider or spider member 52 presently to be described. At any rate, such an eye portion 51 is fastened to the inner side of the larger lug 48 by means of a screw 53 extending at right angles to the adjacent transverse screw 49 and protected against abrasion by a curved shield or wall portion 54 extending from the margin of the eye portion 51.

The split sleeve 39 is shown to be fixed to the impeller shaft by means of a set screw 55, and has an external shoulder 56 and an internal shoulder 57 engaging a corresponding shoulder 58 on the impeller shaft.

The spider member 52 comprises a hub 59 seated upon a shoulder 60 of sleeve 39 and fixed thereto by a pair of eye portions 51 and 51ª (see Figure 4). The hub 59 is of L-shaped profile to form an annular recess for receiving one end of a compression coil spring 61 encircling the sleeve. The spider member further comprises a pair of diametrically opposed spider arms 62 and 63 staggered at right angles with respect to the eye portions 51 and 51ª. The spider arms 62 and 63 are significantly inclined towards the pump housing as indicated by an angle R, and they terminate each in a pair of eyes 64 and 65 to carry a pin 66 constituting the fulcrum for a weighted lever 67 having a weighted outer end portion 68 and a non-weighted inner end portion 69 curved back upon itself in a manner to marginally engage an annular check valve member collectively designated by the character M.

The check valve member M comprises an annular backing plate 70 surrounding the sleeve 39 although having ample clearance 71 therewith (see Figure 3), with the coil spring 61 confined between this plate and the spider hub 59. The backing plate 70 in fact is carried by an annular check valve member 72 proper which consists of resiliently deformable material, for example rubber, and comprises an outer or rim portion 73 which may be internally reinforced as by threads similar to the reinforcement found in the carcass of an automobile tire, a resiliently deflectable diaphragm portion 74 integral with the rim portion, and a hub or collar portion 75 tightly hugging the sleeve 39 and engaging the shoulder 56 thereof and extending into the cylindrical portion 35 of plate 34, to constitute with that portion the annular or valvular gap G which the valve member is to close when the pump is not running, but which it is to maintain open when the impeller shaft is rotating. An annular cap 76 of similar resilient or rubber-like material fits tightly around the impeller shaft as well as around and over the inner end of sleeve 39 to prevent liquid from finding its way in between the sleeve and the shaft. An annular ridge 77 concentric with the impeller shaft is formed upon the outside of the end plate 34 for effective closing of the rim portion 73 of the valve member thereon.

Figure 3:
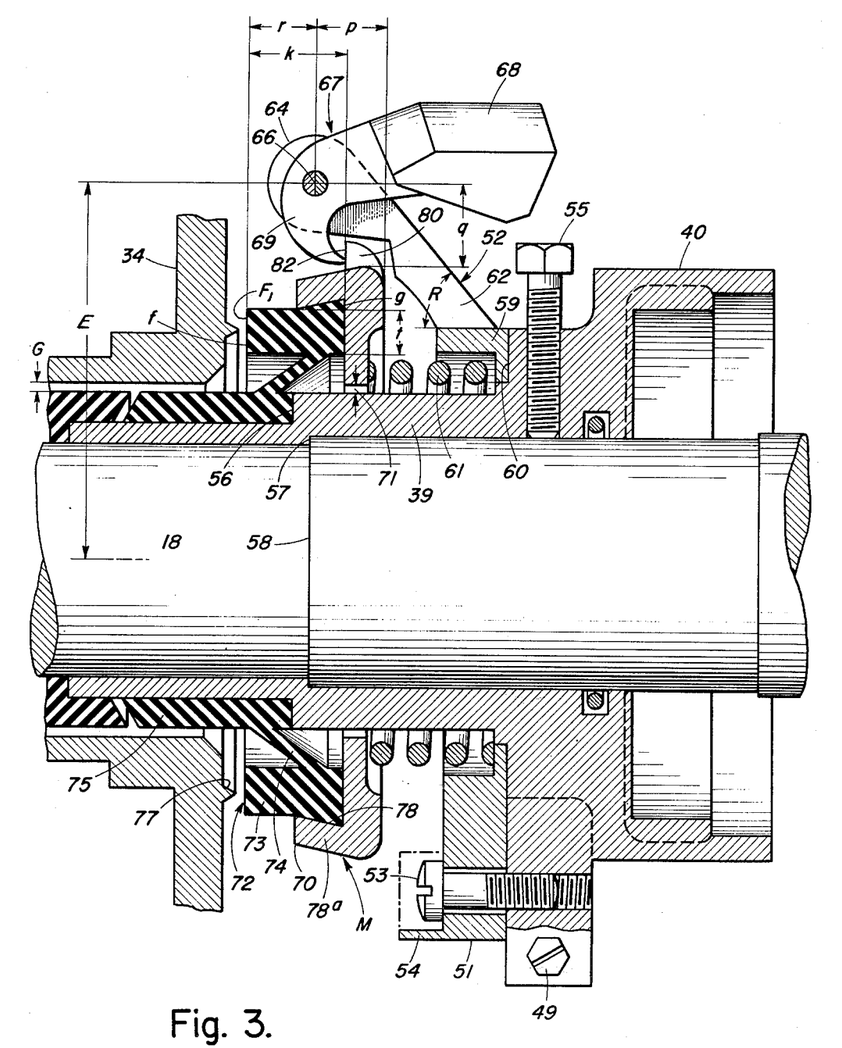
Figure 3 is a further enlarged view of the check valve assembly of Figure 2 with the structural environment omitted.

With reference especially to Figures 3 and 4 the rim portion 73 will be more precisely defined, inasmuch as it embodies certain novel features of mounting interconnection in association with the backing plate 70.

The rim portion 73 is basically shaped like a short but wide cylindrical body having a wall thickness $t$, a height $k$, a face $f$ to close upon ridge 77, and a face $g$ engaging the backing plate 70. That is to say, the outer end of this rim portion or rim 73 widens due to a conical divergence 78 thereof and is surrounded and thus held in dovetail fashion by a corespondingly shaped annular recess or overhanging peripheral portion 78ª formed in and by the backing plate 70. The extreme divergent outer edge portion of the rim 73 is formed with notch-like interruptions 79 spaced from one another a suitable distance along the periphery. These interruptions engage antirotationally with lugs 70ª interiorly provided in the annular recess of the annular backing plate 70.

It will be noted that the spider arms 62 and 63 extend to a point beyond although adjacent to the periphery of the backing plate 70 which is provided with a pair of lugs or peripheral projections 80 and 81, each such lug presenting a transverse cam face 82 engageable by an associated non-weighted end of a respective weighted lever 67. The relative location of the fulcrum points of the two weighted levers with respect to associated parts is indicated by their distances $p$ and $q$ relative to the backing plate 70, and the distance $r$ relative to the closing face of the rim portion 73. The relative foreshortening of the cage member 28ᶜ as a result of this invention is indicated by the effective length K thereof. The distance of the fulcrum points from the axis of the impeller shaft 18 is indicated at E.

It is to be noted that the position of the centrifugal weights 67 as shown in the drawings is such as to indicate that the pump is running, with centrifugal force urging the weights outwardly, thereby maintaining the valve member M in open position against the pressure of spring 61, the gap between the valve member and ridge 77 being indicated at $F_1$. Thus during the running of the pump, the weights 67 hold the valve open so that the shaft may rotate freely and non-frictionally within the valvular gap G, while leakage of slurry from the interior of the pump through the gap is prevented by the auxilliary impeller I exercising a hydraulic pressure by its blades B, counteracting that of any liquid at the inlet side of the pump. The weights 67 hold the rim portion 73 of the valve member floatingly spaced from the ridge 77 by virtue of deflectional deformations of the diaphragm portion 74. The weights 67 are so disposed within the valve actuating mechanism that their kinematic or centrifugal efficiency is high. That is because the fulcrum 66 is disposed with an ample distance E from the axis of the impeller shaft, hence the relatively high rotational speed of the weights creates a highly effective centrifugal force even though with the mass of the weights reduced. Indeed two such weights of relatively small mass have been found to be sufficient and highly effective in the improved construction according to this invention.

In other words, the Figure 3 position of the weights represents a dynamic equilibrium between the centrifugal force exerted by the weights and the pressure of the spring 61, such equilibrium manifesting itself in the fact that the valve is thereby maintained open.

When the pump stops running, there disappears the centrifugal force that urges the weights outwardly, thus allowing spring 61 to cause the rim portion 73 to close and hold tightly upon ridge 77, again by virtue of a corresponding deflectional deformation of the diaphragm portion 74.

What is claimed is:

1. A centrifugal pump having a casing, a rotatable shaft operable in the casing with an annular valvular space between the casing and the shaft, and a check-valve assembly for opening the space when the pump is running and for closing the space at other times comprising a fixed annular plate surrounding the space, a hub engaging the shaft and a peripheral rim supported from the hub by a resilient diaphragm axially deflectable into and out of sealing contact with the plate while the hub remains emplaced, a spring-loaded annular disc supported from the rim for unitary shifting therewith, the annular disc having an overhanging peripheral portion, the rim having a conical divergence thereon, the conical divergence engaged by and retained in the overhanging peripheral portion, and speed-controlled actuating means operable upon the disc for shifting against such spring-load the disc and the rim into non-sealing position.

2. The structure as claimed in claim 1 wherein the overhanging peripheral portion has a plurality of lugs therein, the conical divergence having a plurality of notches therein, the lugs engaging the notches when the rim is inserted in the disc so that the rim is positively moved by the disc under the action of the actuating means.

3. A centrifugal pump having a casing, a rotatable shaft operable in the casing with an annular valvular space between the casing and the shaft, and a check-valve assembly for opening the space when the pump is running and for closing the space at other times comprising a fixed annular plate surrounding the space, a hub engaging the shaft and a peripheral rim supported from the hub by a resilient diaphragm axially deflectable into and out of sealing contact with the plate while the hub remains emplaced, a spring-loaded annular disc supported from the rim for unitary shifting therewith, the shaft having a bearing nearer the valvular space and one farther therefrom, a two-part annular cupped shield shielding the nearer bearing, the shield having a sleeve integral therewith and fixed to the shaft, a spider having a unitary hub portion extending from and rotating with the sleeve, speed-controlled actuating means carried by the spider and engaging the disc for shifting against such spring-load the disc and the rim into non-sealing position, each part of the shield having a plurality of pairs of abutting lugs thereon, and bolt means for securing pairs of the lugs together with the head of each bolt being on the trailing edge of its lug to shield it from abrasion by the suspension being pumped.

4. The structure as claimed in claim 3 wherein the spider is bolted to the shield by a plurality of bolts, the spider having plates upstanding therefrom, the plate curving around the bolt-heads to protect them against abrasion.

ELMER R. WILFLEY.

References Cited in the file of this patent

UNITED STATES PATENTS

| Number | Name | Date |
| --- | --- | --- |
| 1,556,657 | Wilfley | Oct. 13, 1925 |
| 1,947,017 | McHugh | Feb. 13, 1934 |
| 1,976,532 | Wilfley | Oct. 9, 1934 |
| 2,272,454 | Wilfley | Feb. 10, 1942 |
| 2,620,207 | Wilfley | Dec. 2, 1952 |